(12) United States Patent
Benesi et al.

(10) Patent No.: US 7,531,086 B2
(45) Date of Patent: May 12, 2009

(54) PRESSURE FILTER APPARATUS

(75) Inventors: Steve C. Benesi, Novato, CA (US); Patrick J. Costelloe, Walnut Creek, CA (US); Anthony C. Miller, San Francisco, CA (US)

(73) Assignee: FLSmidth A/S, Valby (DK)

( * ) Notice: Subject to any disclaimer, the term of this patent is extended or adjusted under 35 U.S.C. 154(b) by 420 days.

(21) Appl. No.: 10/504,608

(22) PCT Filed: Feb. 13, 2003

(86) PCT No.: PCT/US03/04435

§ 371 (c)(1),
(2), (4) Date: May 6, 2005

(87) PCT Pub. No.: WO03/068271

PCT Pub. Date: Aug. 21, 2003

(65) Prior Publication Data

US 2006/0102545 A1    May 18, 2006

Related U.S. Application Data

(60) Provisional application No. 60/357,535, filed on Feb. 14, 2002.

(51) Int. Cl.
*B01D 25/127* (2006.01)
(52) U.S. Cl. .................... 210/143; 210/229; 210/230

(58) Field of Classification Search ............. 210/227, 210/228, 230, 324, 332, 344, 391, 400, 143, 210/229
See application file for complete search history.

(56) References Cited

U.S. PATENT DOCUMENTS

| | | | | |
|---|---|---|---|---|
| 3,583,566 A | * | 6/1971 | Meshengisser et al. | 210/225 |
| 3,826,369 A | * | 7/1974 | Murata et al. | 210/798 |
| 4,329,228 A | * | 5/1982 | Crowe et al. | 210/230 |
| 4,552,660 A | * | 11/1985 | Schotten | 210/225 |
| 5,246,578 A | * | 9/1993 | Spiegel et al. | 210/225 |
| 5,462,677 A | * | 10/1995 | Benesi | 210/791 |
| 5,510,025 A | * | 4/1996 | Benesi | 210/227 |
| 6,106,713 A | * | 8/2000 | Miller et al. | 210/321.63 |
| 6,159,359 A | * | 12/2000 | Benesi | 210/87 |

* cited by examiner

*Primary Examiner*—Matthew O Savage
(74) *Attorney, Agent, or Firm*—George W. Wasson; Aaron M. Pile; Daniel De Joseph

(57) ABSTRACT

A pressure filter apparatus is shown and disclosed with a construction that permits the filter to be operated to produce food grade or pharmaceutical grade products where there are requirements for periodic cleaning, sterilizing or sanitizing of the apparatus. The structures of the filter apparatus are sloped or clad to drain any fluids away from the apparatus. The exterior can be washed in place and the interior can be washed with the exterior washing or can be operated with internal washing cycles.

49 Claims, 13 Drawing Sheets

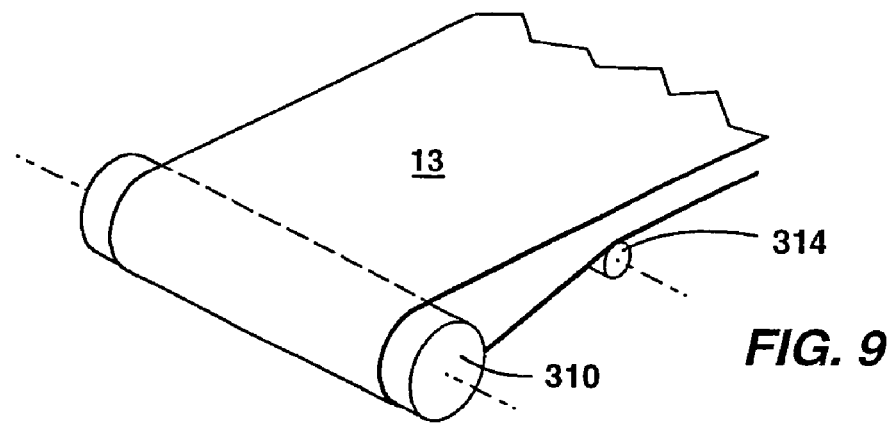
FIG. 9
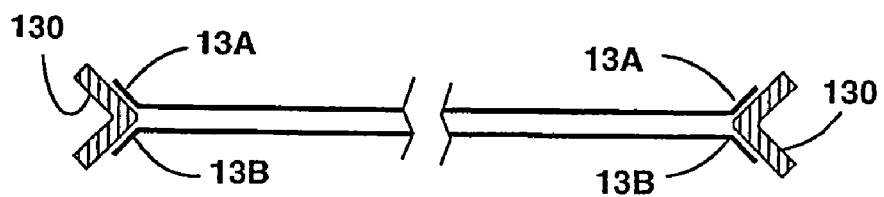
FIG. 10
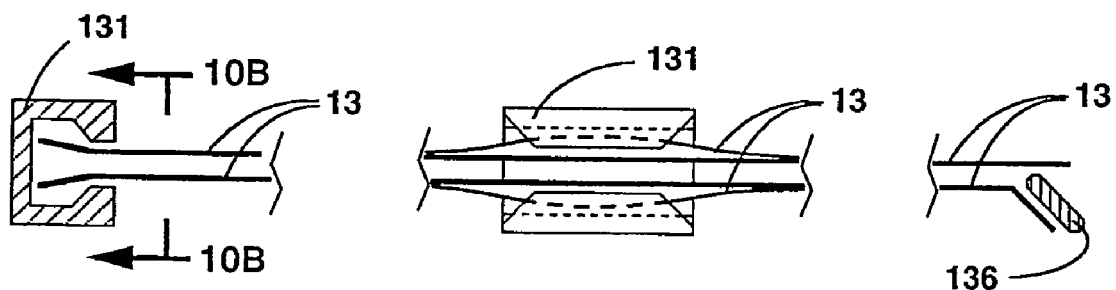
FIG. 10A  FIG. 10B  FIG. 11
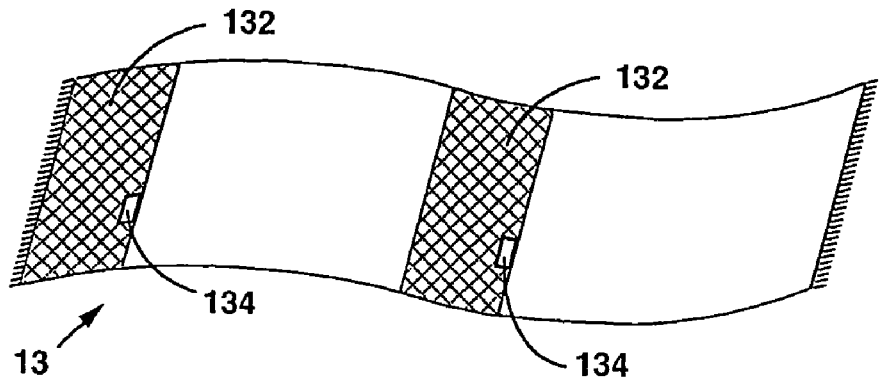
FIG. 12

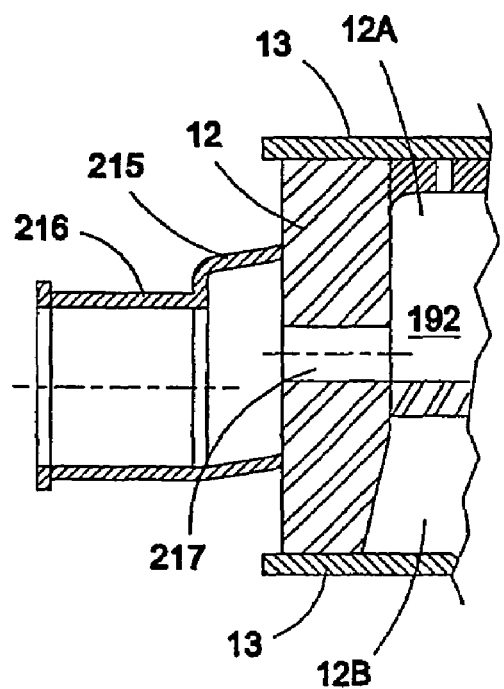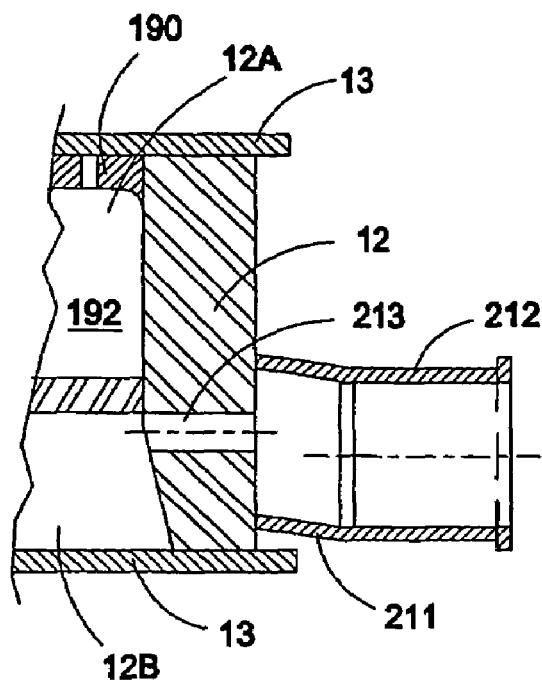
FIG. 22  FIG. 23

PRESSURE FILTER APPARATUS

CROSS-REFERENCE TO RELATED APPLICATIONS

This application claims the benefit of U.S. Provisional Application No. 60/357,535, filed Feb. 14, 2002.

STATEMENT REGARDING FEDERALLY-SPONSORED RESEARCH OR DEVELOPMENT

Not applicable

REFERENCE TO MICROFICHE APPENDIX

Not applicable

BACKGROUND OF THE INVENTION

This invention relates to a filter apparatus and method of its operation, particularly to a pressure filter and method for extracting liquids from wet slurry fluids and for producing a substantially-dry filter cake of the solid materials present in such slurry fluids.

In many industrial processes and other applications where a slurry of solids and liquids is produced, it becomes necessary to filter the slurry solids from the liquids so that these materials may be efficiently utilized or, alternatively, disposed in an environmentally-safe manner. To separate the solids from the liquids, a filter apparatus, such as a pressure filter, is often used. Known pressure filters generally include one or more pairs of filter plates capable of relative motion. The plate inlet is adapted for receiving the slurry while the filtered liquids, called the filtrate, are collected by means of the plate outlet which also provides the requisite support for a filter medium positioned between the filter plates. This arrangement permits a filtration chamber to be defined by the inlet plate and the filter medium when the plates are pressed together. In the usual production cycle of such a filter, slurry is introduced into the filtration chamber under pressure through one or more inlet port, whereby the slurry distributes itself throughout the chamber. After the filtration chamber is filled with slurry, the filter executes a series of programmed operations, namely, washing and/or treating the contents of the chamber in a particular manner, as well as pressurizing the chamber to force the liquids from the slurry through the filter medium, leaving the slurry solids, consolidated in a substantially-dry filter cake, within the chamber. The chamber is then opened, allowing the dry filter cake to be removed therefrom.

In the filter apparatus of the type here discussed, the filter is operated in a batch mode; i.e. apparatus open, apparatus closed, slurry input, treatment of the slurry to develop a cake, apparatus opened, filter medium moved as cake is discharged and advanced to the next cycle position, and then repeating the above steps. The present invention relates to improvements and modifications of pressure filter apparatus. Some of the improvements are intended to adapt such filters for "food grade" or "pharmaceutical grade" applications, and some of the modifications are to accomplish convenience in operation in such filters as well as to improved performance.

SUMMARY OF THE INVENTION

In applications where pressure filters are used in production of "food grade" or "pharmaceutical grade"products, it becomes necessary that the filter and all of its surfaces be cleanable leaving no residue of product or foreign matter, and that the elements of the filter be constructed of noncorrosive or noncorrodible materials. To accomplish that objective, surfaces of the filter apparatus must be vertical, sloped or clad to be drainable. All connections to the equipment must be substantially leak proof and, should a possible leak occur, that leak should be directed away from the filter. Drainage from the apparatus must drain away from the apparatus so as not to contaminate the surfaces of the apparatus.

In the particular filter apparatus discussed herein, there are both single chamber and stacked chambers of a filter apparatus. The chambers of the apparatus include an upper plate and a lower plate member that are closed together to form a chamber for filtering and are separated for removing a formed filter cake from the chamber. A filter belt is positioned between the plates to function both as a filter medium and as a means for transporting the cake formed during the filter operation from the filter chamber. The plates of each stacked chamber may be separated sequentially or at the same time and the belts of each chamber may be moved at the same time or sequentially. One of the features of the filter apparatus of the present disclosure is the use of stronger link members to accomplish the separation of the plates.

The filter belts used in the pressure filter apparatus of the present invention are a continuous filter medium loop belt for each chamber. The belts include marking means that cooperate with sensing means to position the belt in the correct position between the plates to cover the filter area before the plates are pressed against each other to form the chamber. The belts must be carefully aligned with the chambers to insure that the travel through the filter is properly aligned laterally across the filter. The belts must be cleaned between each cycle of the filter to place a clean filter medium belt portion within the chambers for each cycle. These features and how they are accomplished are included in this disclosure.

Improvements in the drive mechanism for the belts is disclosed herein. The belts are easily moved when clean, but when a cake is created on the belt and the belt must be moved from the chamber, there is an inertia that must be overcome. An improved belt drive roller is disclosed along with an alignment of the belt, the drive roller and idler roller that gives increased contact between the belt and the drive roller. A modification of a portion of the belt surface to provide for better contact between the belt and the drive roller is also disclosed.

An improvement in the feed system to the chambers by a modification to the header that feeds slurry and other fluids into the filter, and the slope of the drain of those headers after filling a chamber and the slope of filtrate exit conduits and wash fluid conduits to accomplish contamination free operation is disclosed.

The structural members and the elements that support the filter plates are similar to the structures shown in issued U.S. Pat. Nos. 5,059,318, 5,292,434, 5,462,667, 5,477,891, 5,510, 025, 5,573,667, 5,515,713, 6,159,359, 6,491,817 and 6,521, 135 all incorporated herein by reference.

The advantages of the present invention will become apparent after consideratin of the ensuing description and the accompanying drawings.

BRIEF DESCRIPTION OF THE DRAWINGS

The present invention is illustrated by way of example and not by way of limitation, in the figures of the accomanying drawings, where:

FIG. 9 is a perspective view of the filter belt transporting means.

FIG. 10 is a sectional view of one form of an alignment system for a filter belt.

FIG. 10A is a sectional view of an alternative form of filter belt alignment.

FIG. 10B is a sectional view taken along the lines 10B-10B of FIG. 10A.

FIG. 11 is a sectional view of another alternative form of filter belt alignment.

FIG. 12 is a partial perspective view of a filter belt with an elastomeric impregnation along a portion of the belt.

FIG. 22 is a sectional view of the output port of a filter plate.

FIG. 23 is a sectional view of the input port of a filter plate.

DETAILED DESCRIPTION OF THE DRAWINGS

Figure 1:
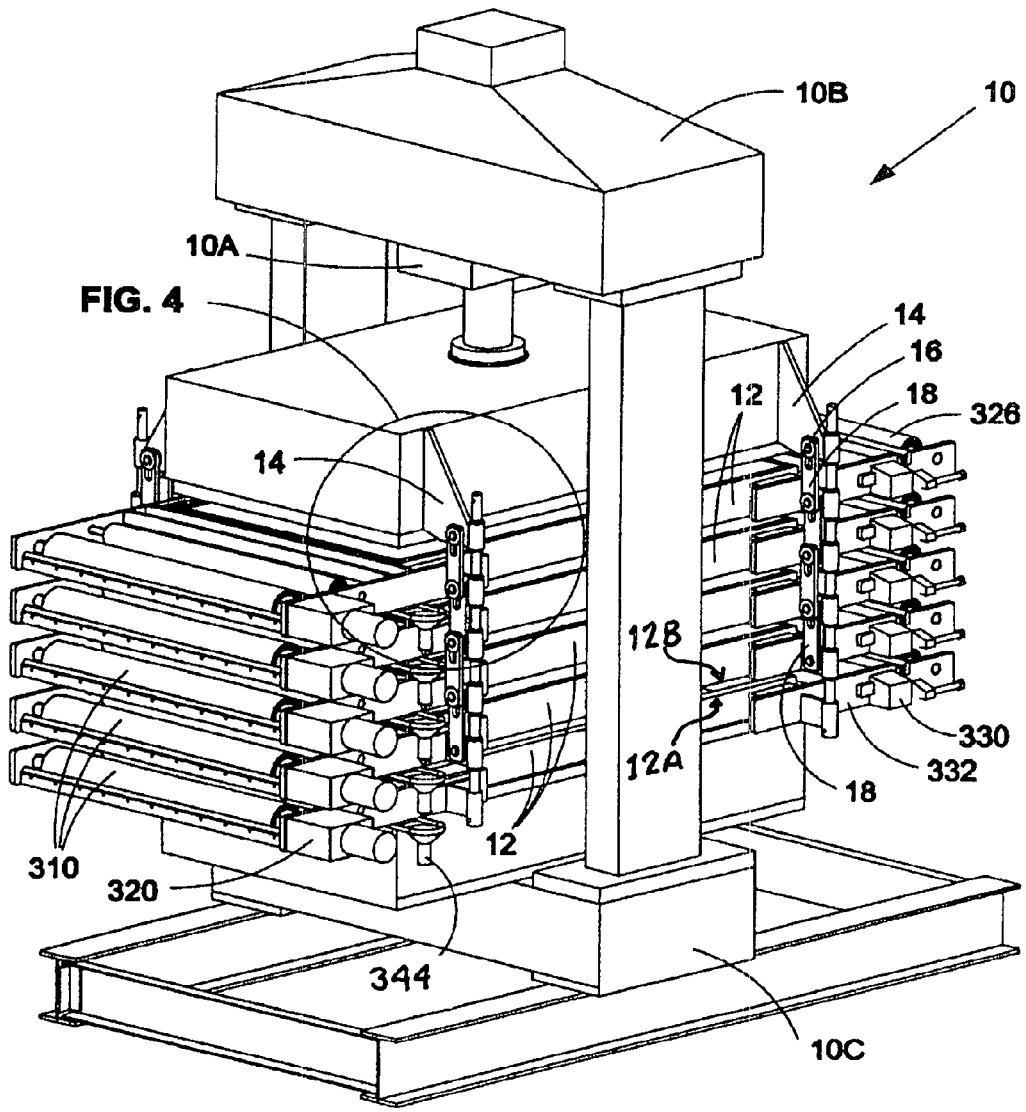
FIG. 1 is an isometric drawing of a stacked filter apparatus of the present invention.

FIG. 1 is an isometric view of a stacked chamber pressure filter apparatus i0 and illustrates the alignment of the stacked chambers consisting of separable plates 12 that form each chamber. Plates 12 comprise, at their upper surface, the bottom plate 12A of one chamber and, at their bottom surface, the upper plate 12B of the next adjacent chamber (shown more clearly in FIGS. 20-24). A filter belt 13 (not shown in FIG. 1) is placed between the adjacent plates 12 and within the chamber"formed by those adjacent plates to function as a filter medium for separating liquids and solids of a slurry; the solids are formed as a cake on the belt and the liquids flow through the belt and out of the chamber. The plates 12 are pressed together by the action of a hydraulic drive system 10A, operating between the upper and lower strongback members 10B and 10C, respectively, and acting on the upper plate 12B of the top chamber. The plates 12 are separated after filtering has been effected and are separated by action of the system 10A and support bracket 14, pin 16 and link 18 operated with the hydraulic drive system 10A raising the top plate.

Figure 2:
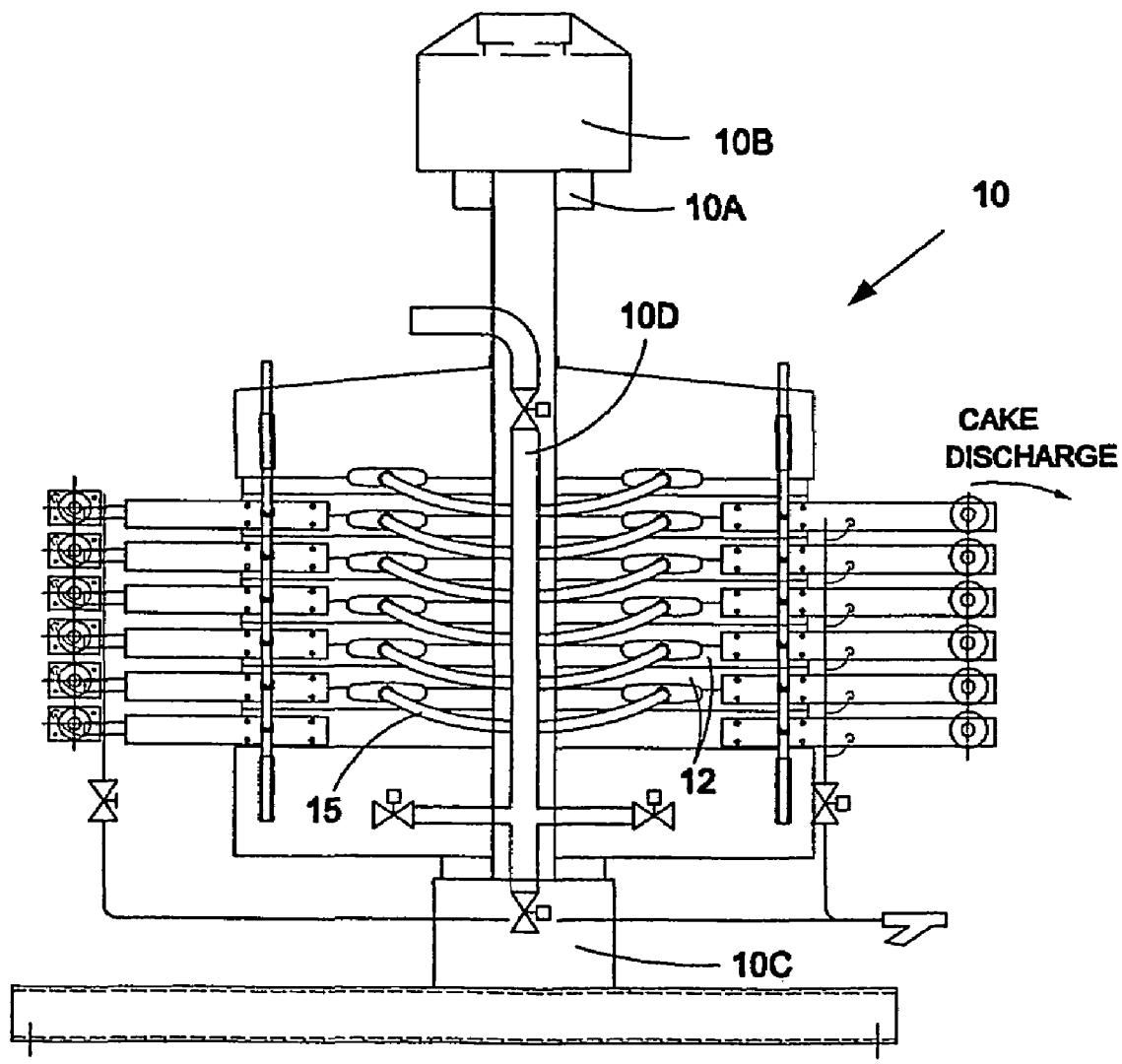
FIG. 2 is a side elevation view showing the input side of the filter apparatus.
Figure 3:
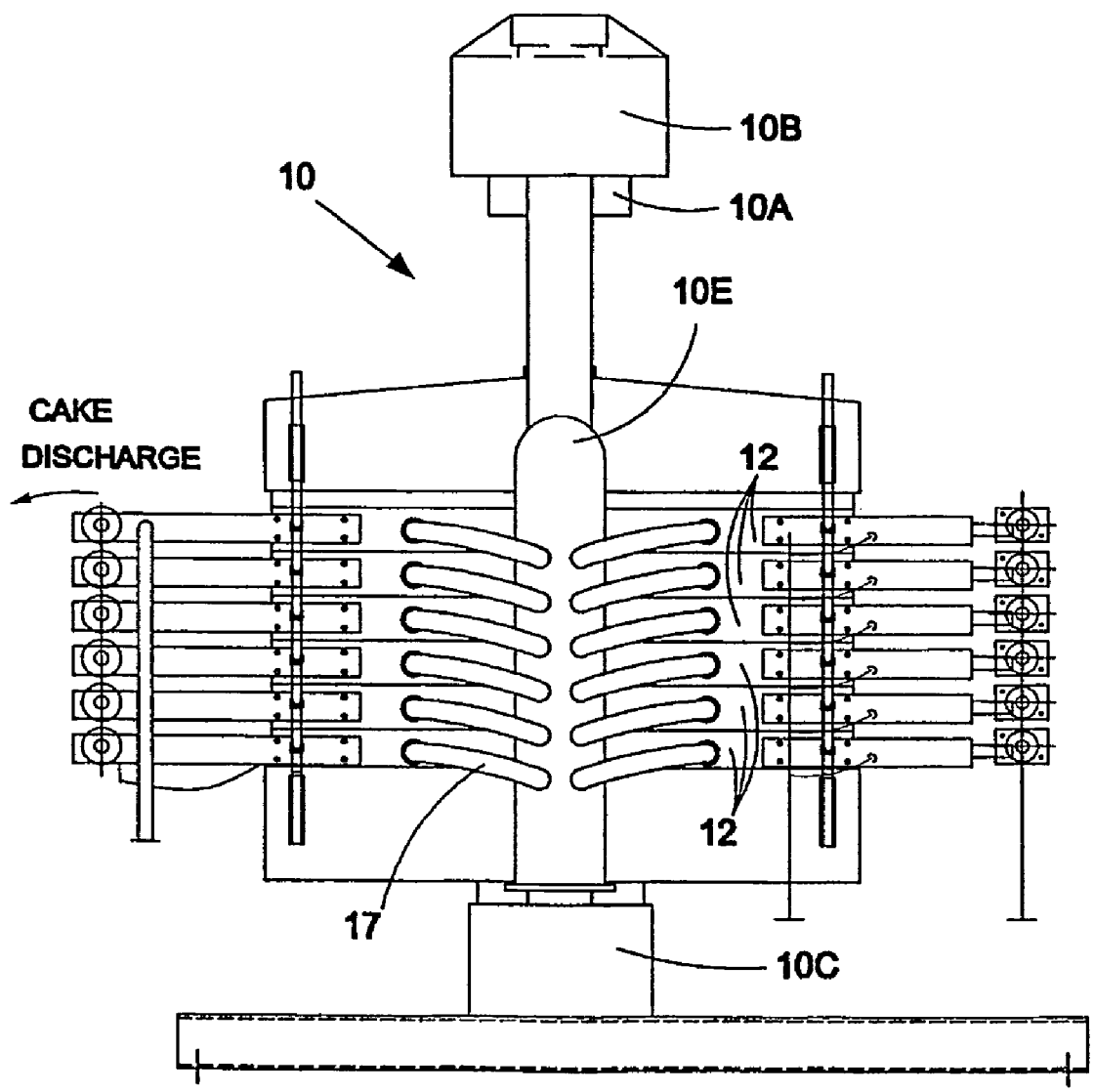
FIG. 3 is a side elevation view showing the output side of the filter apparatus.

FIG. 2 illustrates the input side of the filter apparatus and shows the stack of six filter chambers 12 between the upper strongback 10B and lower strongback 10C and indicates that the space between the strongback members can accomodate five, as in FIG. 1, or more, as six in FIGS. 2 and 3. The input side includes an input header 10D for entry of slurry, wash fluids, gasses, etc. to the filter chambers 12 through flexible conduits 15. The input header 10D is shown as a single line however it should be understood that the header is of a size to transport slurry, liquids and gasses. Suitable valving elements are provided to connect the sources of slurry, wash liquids and gasses to the header 10D, those valves being under control of a suitable computer or other automatic control system.

FIG. 3 illustrates the output side of the filter apparatus and shows the stacked filter chambers between the upper and lower strongbacks. The output side includes an output header 10E for solids, liquids and gasses that flow through the filter chambers. That output is from the chambers and connected to the header 10E by suitable flexible conduits 17. The header 10E is connected to a collection point, not shown, where the materials within the header are directed to a place for solids, liquids or gasses depending upon the filter operation being conducted by the filter apparatus.

FIGS. 2 and 3 illustrate the belt drive and belt pulley systems at the discharge end (right side of FIG. 3) and the belt entry or tail end (left side of FIG. 3) as well as the drive motor support at the discharge end.

In FIGS. 1, 2 and 3 the structural members of the filter apparatus 10 are shown with clad surfaces. The cladding of the surfaces makes the exterior of members 10A, 10B and 10C totally enclosed with surfaces sloping away from the filter apparatus. The headers 10D and 10E are also covered to prevent accumulation of retained materials. All of these exterior surfaces are easily cleaned and any cleaning fluids drain away from the filter apparatus.

Figure 4:
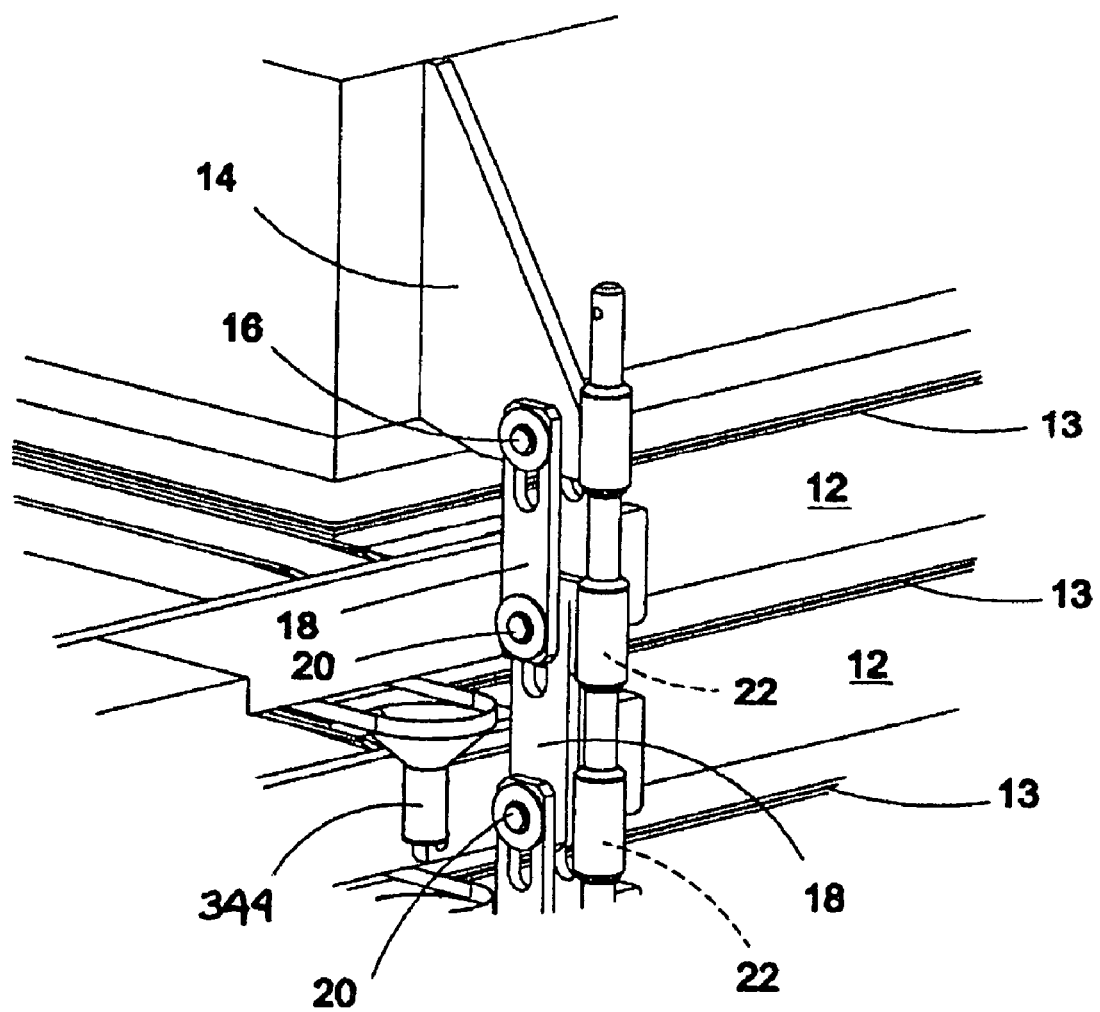
FIG. 4 is an enlargement of the portion circled in FIG. 1.

FIG. 4 is an enlarged showing of the brackets 14, pins 16 and lifting links 18. At each side (only one side shown in FIGS. 1 and 4) of the assembly, a pair of upper support brackets 14 are operatively attached to the upper plate 12. These brackets include an upper pin 16 adapted to cooperate with the upper end of a pair of lifting links 18. The lower end of the lifting links 18 cooperate with an intermediate pin 20 attached to intermediate support brackets 22 on the outside of the next lower chamber plate. These elements of the lifting system are made of stainless steel (or other noncorrosive alloys) and their surfaces are vertical, sloping and chamfered, rounded or beveled to avoid any horizontal surfaces that might hold any contaminating materials. These elements are completely cleanable in place in the cleaning of the apparatus.

Between each plate 12 and its next adjacent plate 12 there is a duplicated set of the brackets 14, pins 16 and links 18. The operation of the links is such that as the upper plate is raised, its link is raised with the upper support bracket and as that link is raised, it cooperates with the next lower intermediate pin 20 and intermediate support bracket 22 to lift that plate and open that chamber. Each lower plate is raised with the link from the plate above it until all chambers are open. The links do not function in closing of the chambers in that both gravity and the pressure of the hydraulic system close the plates against each other.

The bracket, pin and link system shown in FIG. 4 provides for a strong lifting capability. In the apparatus as shown, the weight of each plate in a large assembly can weigh in excess of 4,000 pounds and, in one form of the invention, the links at the top of the assembly must support the accumulated weight of all lower plates. The links are of a strength that will support the total weight of those plates below each link. Alternatively, the links are arranged in pairs such that the lifting forces are balanced and do not transfer the accumulated moments or lifting forces from the plates below into the brackets or filter plate. Further, the link support system eliminates the requirement of adjustment of the lifting mechanism; the links always provide for the proper spacing of the plates when opening the chambers. The links here shown are in the form of a bicycle-chain-like configuration; it should be understood that interconnecting chain links with or without pins could be equally effective in this plate lifting mechanism.

Figure 5:
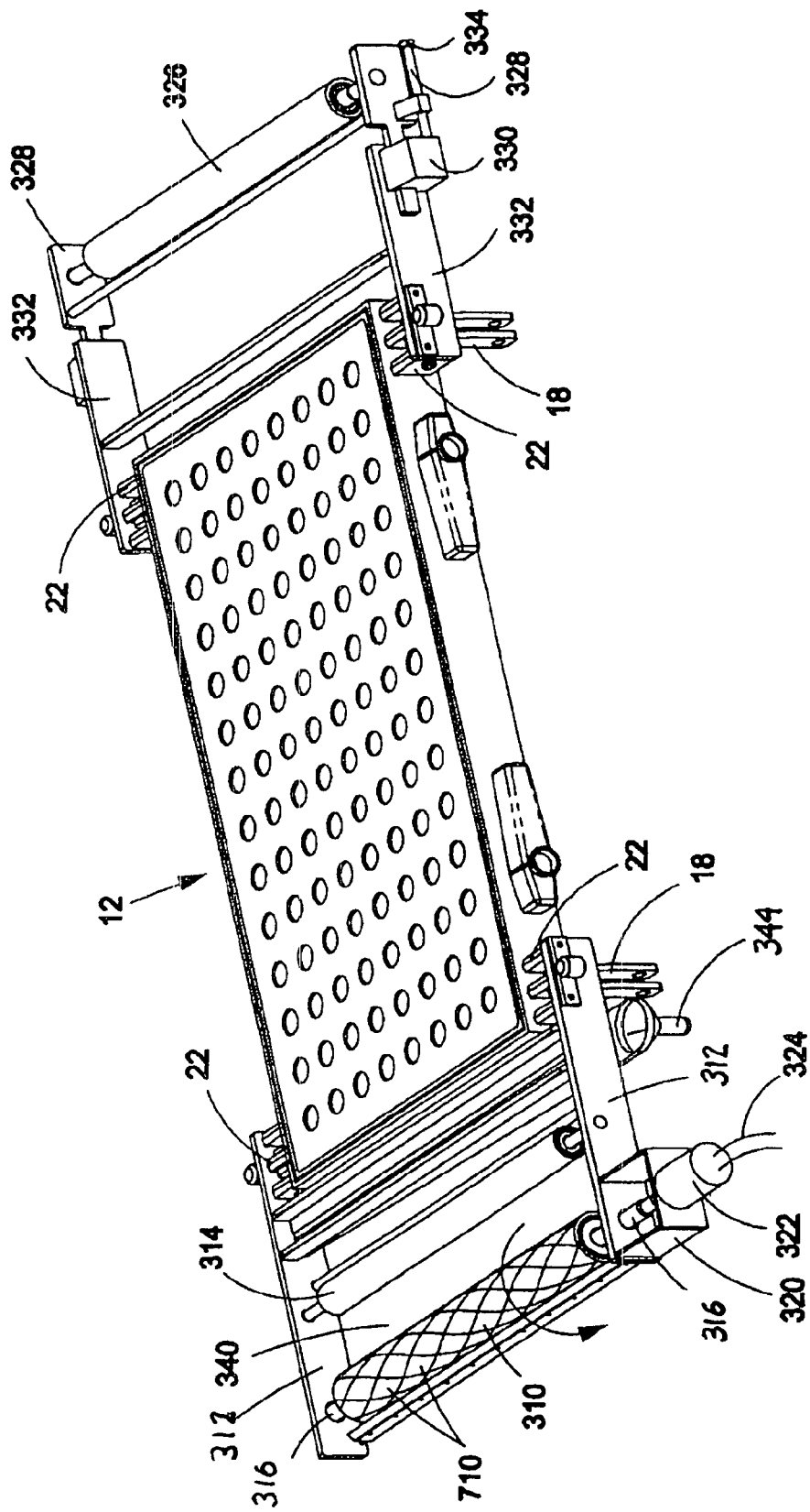
FIG. 5 is an isometric illustration of the upper surface of a filter plate as used in FIG. 1.

FIG. 5 illustrates the full length drive pulley 310 and the idler pulley 314 at the discharge end of a plate 12 both supported on bearings in drive support arms 316 at each side of the plate 12. The drive pulley is on a shaft 318 that extends into a drive motor support bracket 320. It should be noted that the bracket 320 has only vertical sides to minimize any horizontal surfaces that might accumulate possible contaminants. A totally sealed hydraulic drive motor 322 with hydraulic drive tubing 324 is mounted on the bracket i20 320; the connection of the hydraulic tubing to the motor include leak-proof fittings with any possible leak area directed away from the filter to avoid contamination by hydraulic fluids.

The idler pulley 314 is supported on the support arms on the filter plate side of the drive pulley with the axis of the idler pulley higher in a lateral direction across the bracket than the axis of the drive pulley; the purpose of this alignment will be described hereinafter.

At the tail end of the plate, the tail end pulley 326 is rotatably supported at both sides of the plate 12 in suitable bushings or bearings on tail paddles 328. The tail paddles are movably supported in adjustable supports 330 mounted on tail support arms 332 suitably fastened to and spaced from the plate 12. An adjustment bolt 334 cooperates with a threaded portion on the supports 330 to provide for adjustable movement of the tail paddle 328 for moving the tail pulley 326 toward and away from the tail end of the plate 12. The adjustment position of tail paddle by the bolt 334 at an easily accessible exterior of the filter apparatus provides for ease in adjusting the position of the tail end pulley to assure that the belt supported on the pulley is both properly stressed in its longitudinal dimension and properly aligned across the filter to assure the desired tracking of the belt within the filter. All surfaces of the belt filter medium transporting means are constructed to prevent accumulation of retained materials.

In some slurry filtering operations where heavy sticky or difficult to move materials are washed from the filter belt medium, it is possible to include a drain pan wash system, not shown, to assist and completely remove the difficult to move materials and to wash them to the drain.

Figure 6:
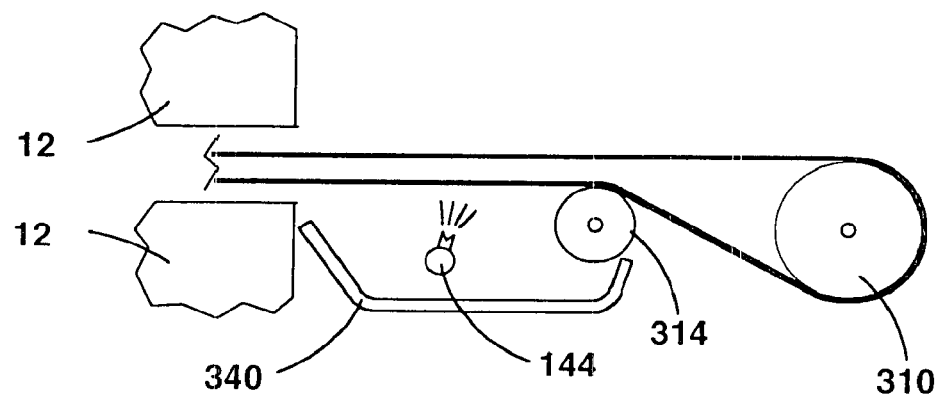
FIG. 6 is a partially schematic illustration of the belt drive and belt cleaning apparatus.
Figure 7:
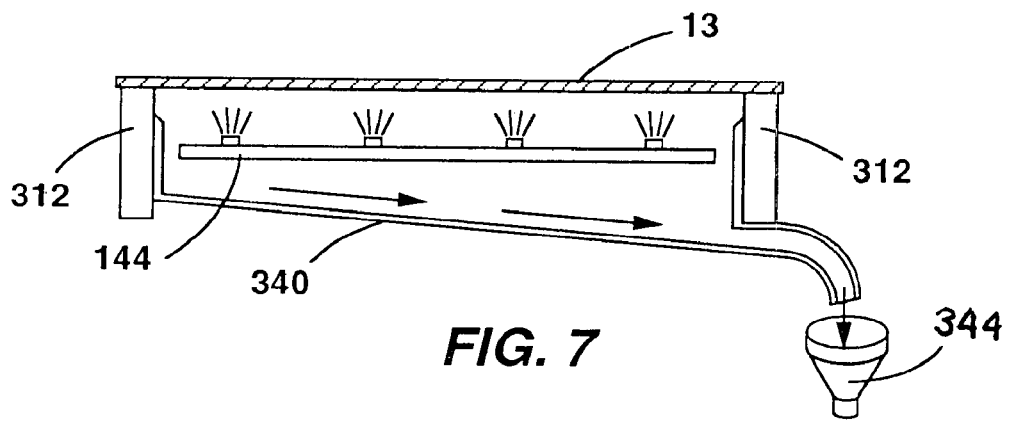
FIG. 7 is a schematic illustration of the belt cleaning drip pan.

FIG. 5 also shows the drain pan 340 under the idler pulley 314 and its drain port 342. In the belt washing systems, to be described hereinafter, belt wash fluids are forced against a filter belt while aligned with the drain pan and before it passes toward the plate 12. The belt washing fluids are intended to remove any remaining solids from the outer surface of the belt and to transport them away from the filter apparatus. The belt washing fluids and solids fall into the drain pan 340 and exit from the pan through drain port 342. As shown in FIGS. 6 and 7 the drain pan has rounded interior corners and is tapered and slopes toward the drain port. The exit of the drain port fits into reducer segments 344 that collect the drain wash fluids and solids and pass them to a suitable drain away from the filter.

Figure 14:
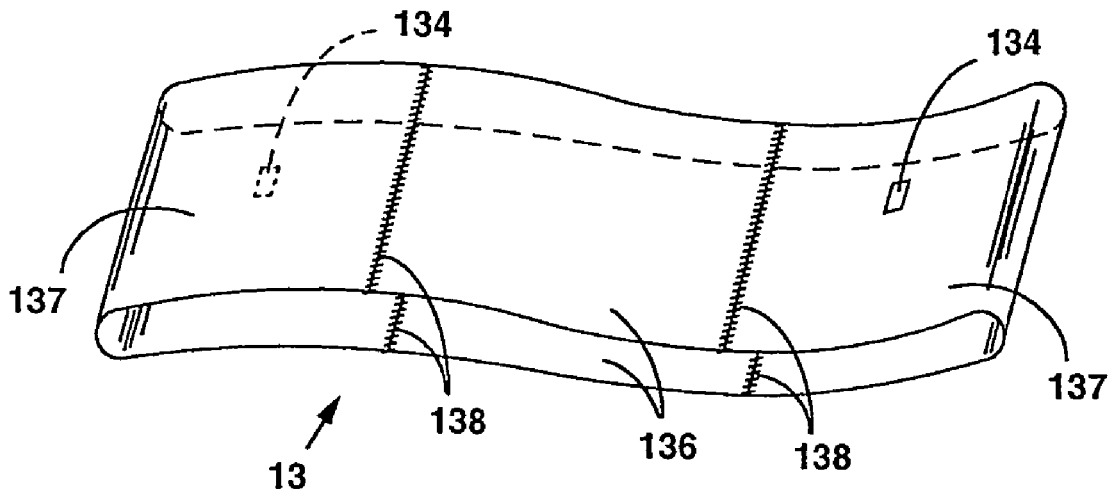
FIG. 14 is a perspective view of a filter belt formed with separate sections of different materials.
Figure 15:
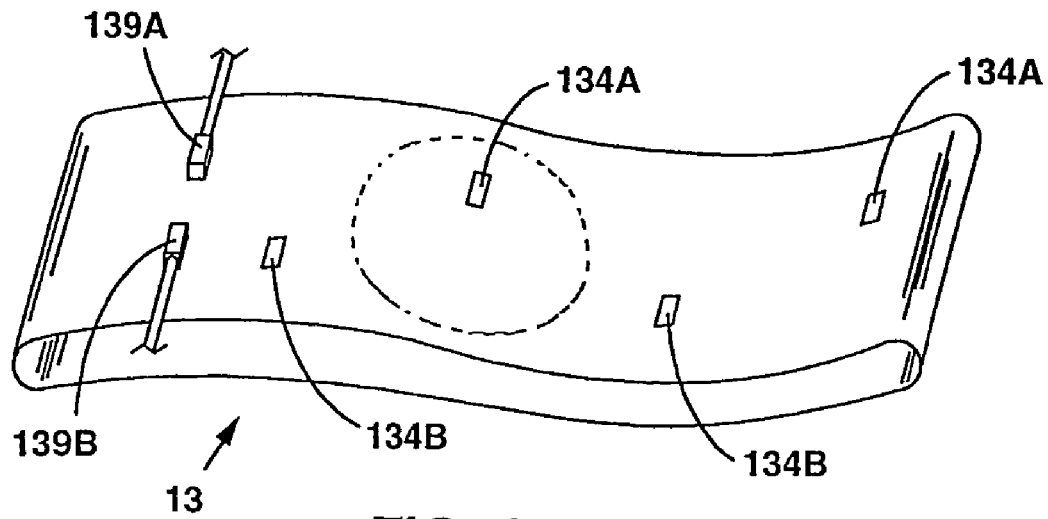
FIG. 15 is a perspective view of a filter belt with a plurality of marking means and a schematic illustration of marker sensing means.
Figure 16:
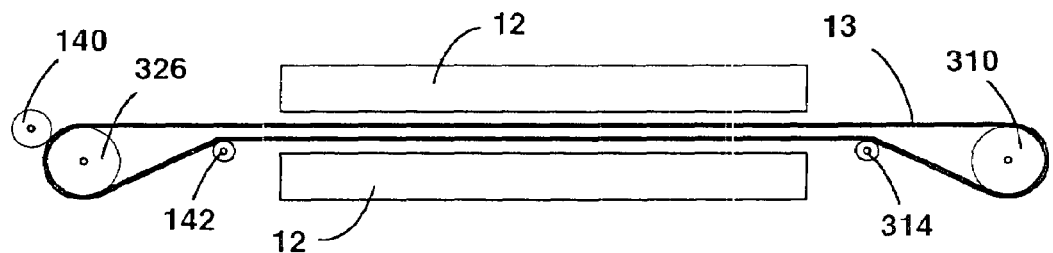
FIG. 16 is a schematic illustration of a belt travel measuring means.

FIG. 5 also illustrates an improved construction for the drive pulley 310. As stated earlier, the drive pulley 310 pulls the filter belt 13 through the filter apparatus to position the belt within the open chamber prior to a filtering operation and moves the belt from the chamber with an accumulated filter cake after the completed filtering operation. The filter belt 13, as shown in FIGS. 14-16, is a continuous belt including marking means that will be sensed by sensing means on the filter assembly to place the belt 13 in the proper position for a filtering operation. As stated earlier, a filter cake adds an additional weight to the belt and requires that the drive to the belt drive pulley 310 be adequate to move the belt 13 under that additional weight of the cake as well as overcoming any inertia that the weight of the cake adds in the movement of the belt from the filter. To avoid slippage of the belt 13 on the drive pulley 310, the disclosed construction of the drive pulley, the positioning of the idler pulley with respect to the drive pulley and, in certain applications, the modification of a portion of the belt surface insures that the belt is moved as desired.

As shown in FIG. 5, the surface of the drive pulley 310 may have the addition of elastomeric, or other non-slip materials, at 710 in a distributed pattern. This added material provides for non-slip contact between the belt 13 and the pulley 310 to insure that the belt can be moved from the chamber with the additional weight of a deposited filter cake. The pattern of the applied materials is intended to insure substantially continuous contact of the belt and, in certain applications, the applied material on the drive pulley.

Figure 8:
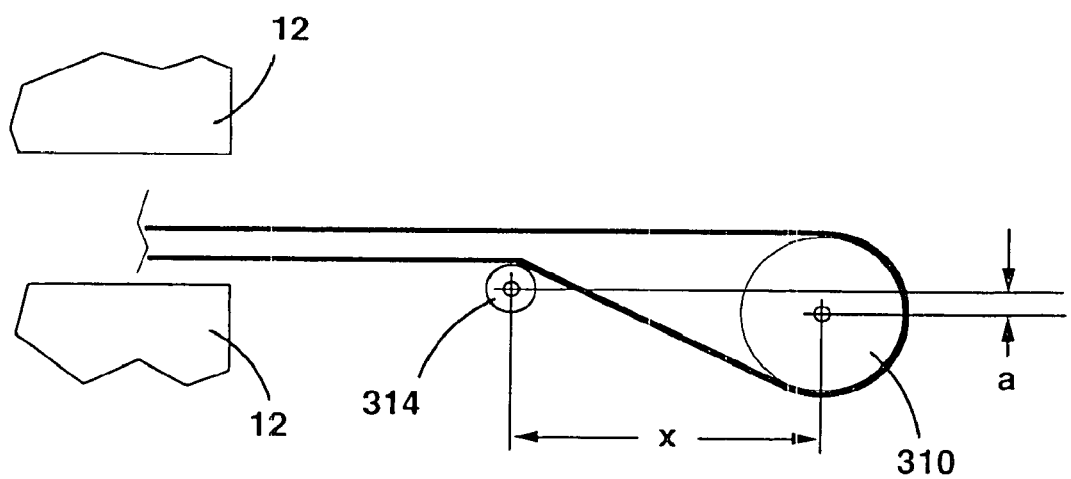
FIG. 8 is a schematic illustration of the filter belt drive means.

As shown in FIGS. 8 and 9, the alignment of the axis of rotation of the drive pulley 310 and the idler pulley 314 with respect to each other and with respect to the plane of the filter plate 12 is such as to increase the circumferential contact between the surface of the drive pulley 310 and the filter belt 13 and to align the belt for ease of travel through the filter. The vertical difference between the axis of the drive pulley and the idler pulley is represented by the distance "a" and can be designed to be adjustable to increase or decrease the amount of contact with the drive pulley perimeter. The horizontal distance between the axis of rotation of the drive pulley and the idler pulley, shown here by the distance "x", also contributes to the increased contact between the belt 13 and the drive pulley 310 surface. The closer that the idler pulley is to the drive pulley the sharper will be the angle that the belt travels between the drive and idler pulley. Other space restraints, such as the belt wash conduits and wash fluid drain pan, restrict the positioning of these two pulleys as will be described hereinafter. FIG. 8 also illustrates the elevation of the belt 13 with respect to the top surface of the lower plate 12. Raising the path of the belt as it travels into the area where filtering is to occur reduces the drag of the belt 13 on the face of the plate 12 thus reducing abrasion of the plate and possible wear of the belt.

FIG. 9 illustrates the dimensional difference between the width of the drive pulley 310 and the belt 13. The pulley 310 may be wider than the belt to assure complete contact with the belt 13 and to permit the belt to be positioned laterally across the pulley to assure proper exit and entry from the filter chamber of the apparatus. Alternative applications may use pulleys narrower than the belt width.

FIGS. 10, 10A, 10B and 11 illustrate belt "trainers" that function to keep the belt 13 in a desired alignment within the apparatus. FIG. 10 shows the upper and lower portions of the belt constrained by "trainers". For example, edges 13A may be associated with the entering portion of the belt into the trainers and edges 13B may be associated with the exiting portion of the belt. The belt should be kept under tension in the direction of its travel. As the belt 13 is transported into and out of the filter chamber, the edges of the belt may be passed along a training surface 130 that causes the edges 13A and 13B of the belt to be flexed away from the plane of the rest to the belt. The trainer 130 has a finite length along the path of travel of the belt. That flexing of the belt has a tendency to move the belt laterally to even its position between the trainers 130. Operationally this tends to keep the belt 13 properly aligned within the apparatus and in the proper position for entry and exit from the apparatus.

FIG. 10A illustrates an alternative form of a trainer wherein the belt 13 passes into the interior of a trainer 131 where the edges of the belt 13 can contact the interior of the trainer and become flexed by engagement with the back of the interior. FIG. 10B is a side view of the trainer of FIG. 10A. FIG. 11 illustrates a trainer as a single surface contacting only one part of the belt 13, either the exiting or the entering portion of the belt can be contacted.

Figure 13:
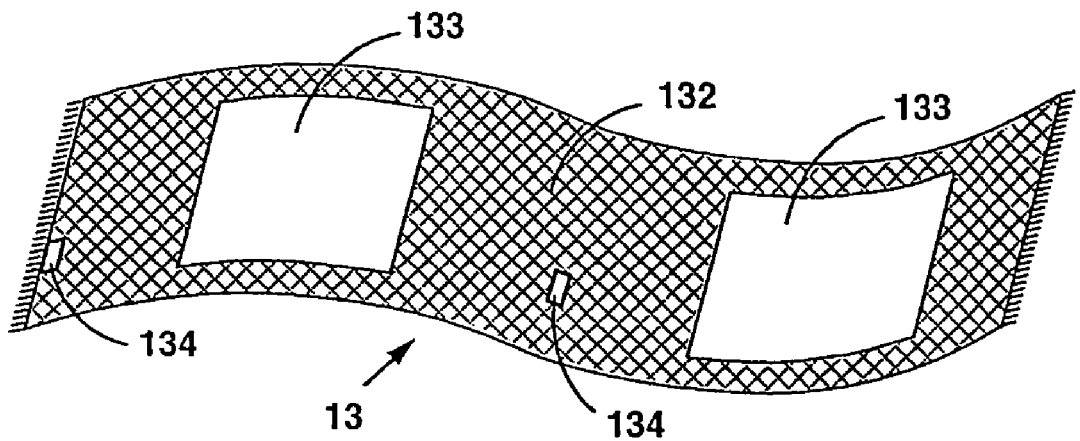
FIG. 13 is a partial perspective view of a filter belt with two impregnated areas.

Several modified forms of the filter belt 13 are illustrated in FIGS. 12, 13 and 14. It should be understood that the filter belt 13 includes a marking means that cooperate with a sensing means in the filter apparatus that transmits a signal to a controller and causes the belt to be stopped at desired position(s) with each filter apparatus cycle. A cycle is the positioning of the belt within the apparatus, the closing of the filter plates to form the filter chamber, the introduction of slurry, the separation of liquids from solids within the chamber to form a filter cake, the opening of the plates, the removal of the belt from the opened filter area to transport the cake to a discharge place, and the repeat of the above steps to position the belt again within the filter apparatus. As stated earlier, after the cake is formed the belt has increased weight on it and the movement of the belt requires greater force from the drive pulley.

FIG. 12 illustrates a modification of the belt 13 as used in the filter apparatus shown in the previous FIGS. The figure shows a continuous belt disconnected at its seam and resting in a relatively flat configuration. It should be understood that alternative belt forms, with and without the following modifications, may be used. An elastomeric material 132, or other non-slip material, is impregnated into the filter belt at the position the belt will be in when the filter chamber is opened and when the belt and cake are to be withdrawn. The marking means 134 on the belt assures that this non-slip portion will always be in contact with the drive pulley at the correct time. If the belt is intended to be stopped at two places along the travel within the filter appartus, there will be two such modified portions 132 of the belt and two marking means 134 on the belt. FIG. 13 illustrates an alternative form of a belt with two unimpregnated filter areas 132 and two appropriately spaced marking means 134.

FIG. 14 illustrates an alternative form for the belt 13 wherein a filtering area 136 is positioned within the continuous belt 13 between belt material that may not be used as a filter medium. In the operation of the continuous belt filter medium of the present invention, the belt is transported through the filter apparatus and a filter portion 136 is used for filtering while the remainder (or most of the remainder) of the belt may function to transport that filter portion 136 through the apparatus. The filter portion of belt 13 may also serve to enhance desired filtering characteristics. The initial filter portion may require a special weave for permeability and as serving as a gasket or cushioning material at mating surfaces when the plates are closed. The belt 13 shown in FIG. 14 has the filter portion 136 spaced along alternate material portions 137. Seams 138 connect the filter and alternate material into a continuous belt 13. Markers 134 are placed along the belt 13 at the desired position from the filter portions 136 to assure that those filter portions are between the plates when the plates close to form the chamber. It should be understood that when the belt is within the closed chamber, there are two surfaces of belt within the chamber; one surface is in contact with the slurry and eventually with the cake while the other surface under the filter surface has filtrate flowing through it and may serve one or more of the several functions noted above. Because some filtering operations include caustic fluids or other conditions that could damage or reduce the useful life of lesser fabrics, the portions of the filter belt that are within the chamber during filtering may need to be of different construction from the remainder of the belt. A belt may therefore have two areas of filter materials spaced by two portions of alternate fabrics. Such a construction would require seams between each of the materials along the belt and a set of markers that will insure that the belt is properly oriented to place the filter portion above the second portion with the alternate fabrics outside of the chamber.

FIG. 15 illustrates a further alternative for the filter belt using a plurality of filter positions, one position represented by the substantially circular dashed lines. The belt also uses a plurality of markers in pairs 134A and 134B and a like plurality of sensors 139A and 139B. In this modification, the belt is moved first to position a first portion of the belt within the filter; that movement being controlled by markers 134A and sensor 139A. After that movement the filter apparatus is operated to complete the formation of a filter cake. A second portion of the belt is then moved into the filter area and the cake formed with the first operation is discharged. The chamber is then closed for a second filter operation and the formation of a second filter cake. That series is repeated with a plurality of filtering portions of the belt being in use.

FIG. 16 illustrates an alternative apparatus for measuring travel of the belt. In this form of the apparatus, a wheel or roller 140 is in contact with the belt 13 as it travels over idler roller 142 and the tail end roller 326 and before it enters the filtering area. The position sensed by the wheel 140 can be transmitted to a controller that controls the movement of the belt and operation of the filter. The condition of the belt can also be sensed to determine how clean the belt is and whether it needs further treatment.

Figure 17:
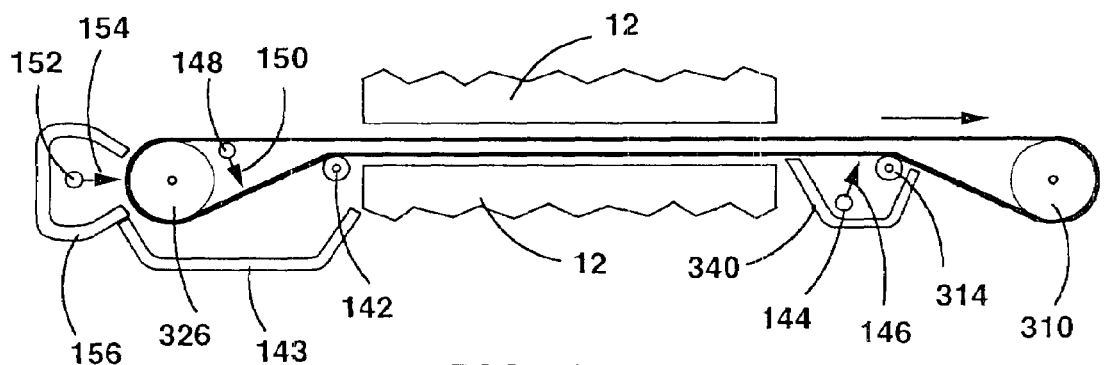
FIG. 17 is a schematic illustration of filter belt washing means.

FIG. 17 illustrates the several places that the belt cleaning can be accomplished with belt cleaning fluids. Multiple locations including Washing nozzles at the exit end of the filter, where the belt 13, traveling in the direction of the arrow, passes over the drive pulley 310 and the idler pulley 314. Below the idler pulley and toward the filter plates 12 is a belt spray cleaning conduit 144 that extends across the entire apparatus and includes nozzle heads that spray belt cleaning fluids toward the underside of the belt 13 as represented by the arrowhead-146. The wash fluids that fall from the belt 13 and any materials cleaned from the belt fall into the drain pan 340 to be removed from the filter apparatus. As previously described, the drain pan is sloped to guide the cleaning fluids and any particles to an exit port where they are removed. The interior corners of the pan are rounded and there are no flat horizontal surfaces in the drain pan where any contaminants could collect. The belt wash fluids can be used to further wash any collected materials out of the drain pan and away from the filter apparatus.

At the opposite end of the filter apparatus, the tail or belt input end, the belt 13 passes over tail end roller 326 after passing over an idler pulley 142. The idler pulley may be replaced with a wear bar that brings the filter belt to the proper alignment for exit from the filter plates. Illustrated within the space between the bottom part of the belt 13 and its top part is another of the multiple locations of belt washing including a belt spray conduit 148 that extends across the entire apparatus and includes heads that direct cleaning fluids toward the inside surface of the belt 13 as illustrated by the arrowhead 150. This cleaning spray can remove any materials that might have been accumulated on the belt when positioned below the filtering surface and carried with any filtrate leaving the slurry. Still another belt cleaning spray may be provided from conduit 152 that directs cleaning fluids in the direction of arrowhead 154 toward the outside surface of the belt as it travels over the tail end pulley 326. This conduit and any fluid or materials are contained by the spray barrier 156. All belt washing fluids can be varied in pressure as needed to effectively clean the filter belt. Any fluid and particles removed from the belt by the sprays 150 and 154 are contained in exit paths 143 away from the filter apparatus.

Figure 18:
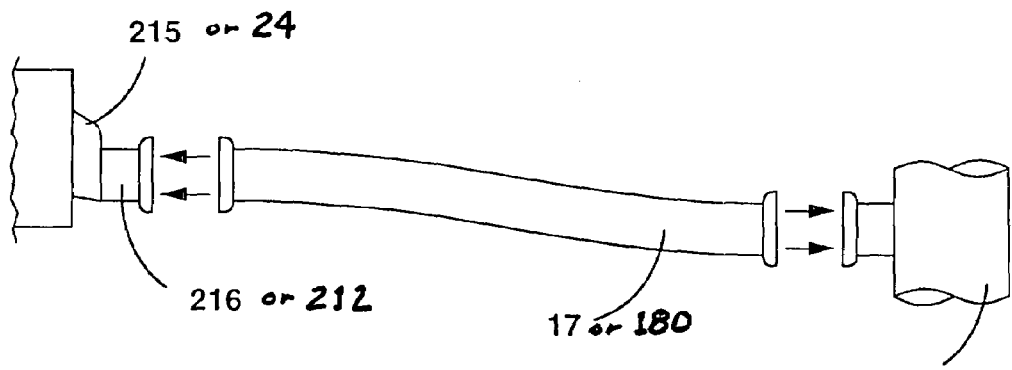
FIG. 18 is an illustration of a sanitary hose connection as used in input and output sections of the filter apparatus.

FIG. 18 illustrates a sanitary hose connection as used in the input header 10D and output headers 10E of the filter apparatus. The sanitary hose connection 180 or 17 (only one form shown) is a flexible conduit with interior and exterior construction that prevents adherence of any contaminants. The hose is connected by suitable clamps, not shown, to the input conduit 212 or exit conduit 216 of a plate 12 and the input header 10D or exit header 10E. The hose must be flexible to accommodate the different positions of the plates 12 when opened or closed.

Figure 19:
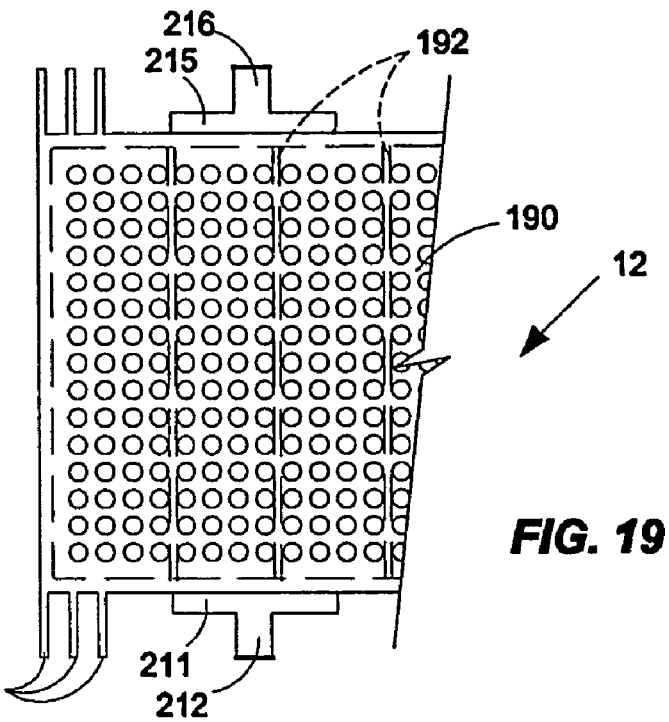
FIG. 19 is a top plan view of a filter plate.
Figure 20:
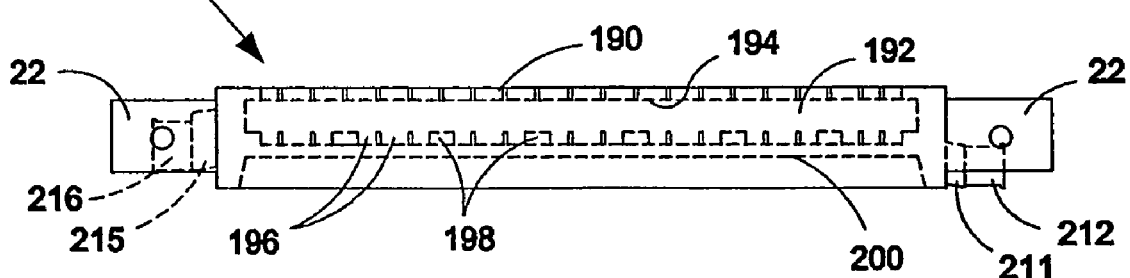
FIG. 20 is a side view and partial sectional view of FIG. 19.

FIGS. 19-26 illustrate the construction of a filter plate 12 that is assembled with other plates to form the filter chamber of a filter apparatus. FIG. 19 is a partial top plan view of the upper surface of the filter plate 12 with a perforated grate 190 supported within the plate 12 on a plurality of parallel, spaced ribs 192 that extend across the filter plate. The ribs have a substantially smooth upper surface 194 for support of the grate and are formed with a series of feet 196 at the bottom with spaced open areas 198 between the feet. A side view of the ribs 192 is shown in FIG. 20. The plate 12 has a horizontal member 200 separating the upper portion containing the ribs 192 and the grate 190 from the lower portion that is open for receiving slurry materials when the plate 12 is closed against an adjacent filter plate 12. The ribs are welded to the horizontal member 200 in spaced relationship across the filter plate 12. The perforated grate 190 and the ribs 192 and the contact with a filter plate have rounded smooth surfaces to prevent accumulation of retained materials within the cavity of the formed filter chamber.

Figure 21:
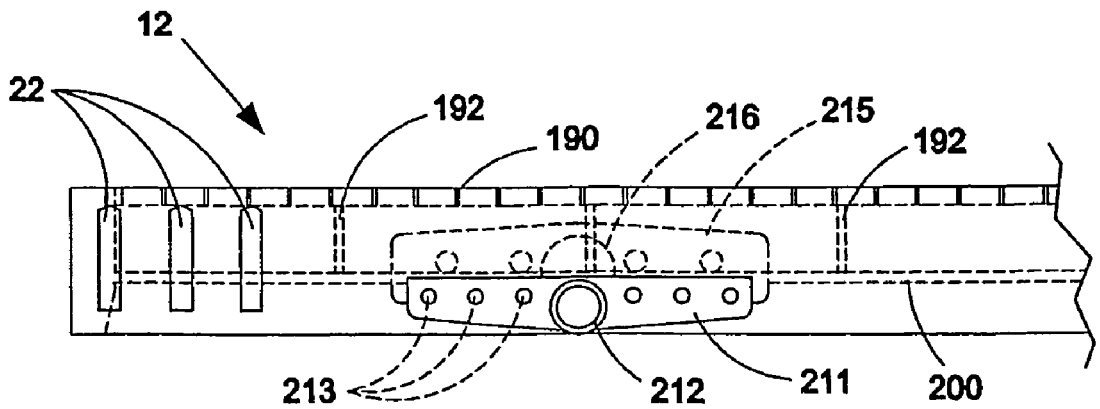
FIG. 21 is an enlarged side view of the filter plate of FIG. 19.

FIG. 21 is a side view of a partial plate section showing the lifting intermediate support brackets 22 and the slurry input distribution ports 211 with its connection conduit 212 for attachment to a slurry feed header 10D and its internal distribution openings 213. FIG. 20 also shows the input port 211 and its connection conduit 212 as well as the exit port 215 and its connection conduit 216 and shows the vertical relationship of these two ports with the exit port 215 shown in dotted lines behind and at the opposite side of the plate 12 shown at the front side of the plate 12. The single plate 12 forms both the bottom portion of a filter chamber at the top of the plate as shown and the top portion of a filter chamber at the bottom of the plate as shown. Plates above and below the plate as shown are pressed against each other with a filter belt between the mating surfaces to form a chamber in a stacked version of the filter apparatus. If single plates are used to form a chamber, the upper plate will contain only the slurry input port and distribution openings and will be open in its interior; the lower plate will contain the exit port, the support ribs and the perforated plate.

FIGS. 22 and 23 illustrate in section the alignment and slope of the interior of the input port 211 and the exit port 215. In the form of the apparatus shown and for the purpose of insuring that there are no undrainable horizontal surfaces, the input and exit ports slope downwardly from the plate 12 so that any liquids that are transported through the ports drain out of the plate. The input slurry entering port 211 passes through the distribution openings 213 to distribute the slurry within a formed chamber. Any slurry remaining in the input port drains away from the chamber because of the slope of the port. The exit port conducts filtrate separated from the slurry in the filtering operation and that filtrate passes through the perforated grate 190, down the space between the ribs 192, through the exit openings 217 and to the exit port 215 and conduit 216. The exit port and its elements all slope away from the plate 12 to insure removal of the filtrate.

Figure 24:
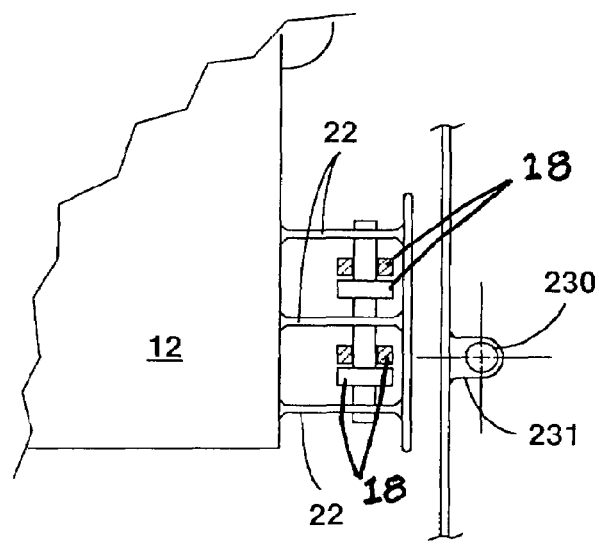
FIG. 24 is a top view of the lifting and aligning means for a filter plate.
Figure 25:
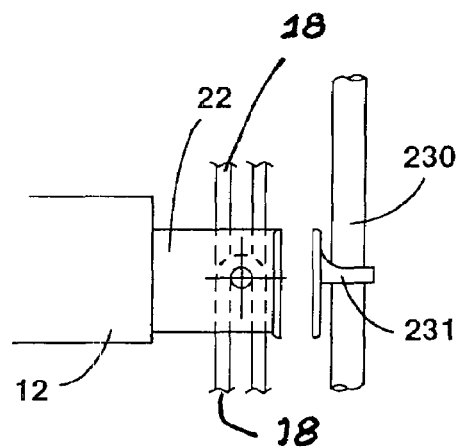
FIG. 25 is a side view of the lifting and aligning means shown in FIG. 24.
Figure 26:
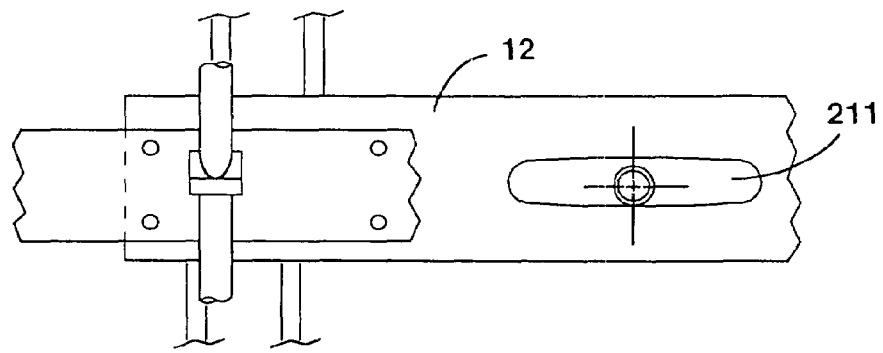
FIG. 26 is side elevational view of the filter chamber showing the aligning means of FIGS. 24 and 25.

FIGS. 24, 25 and 26 illustrate the relationship of the lifting support brackets 22, the lifting link 18 (shown in FIG. 25 in its chain link form), the guide rod 230, the guide 231, and the input port 211. The guide rod 230 cooperates with the guide 231 on each plate to insure that the adjacent stacked plates 12 of a stacked plate filter apparatus are properly aligned. Alignment is essential to insure that an effective seal is produced between the plates forming a chamber to permit the pressure operations within the chamber that separate the filtrate from a slurry to form a filter cake.

Figure 27:
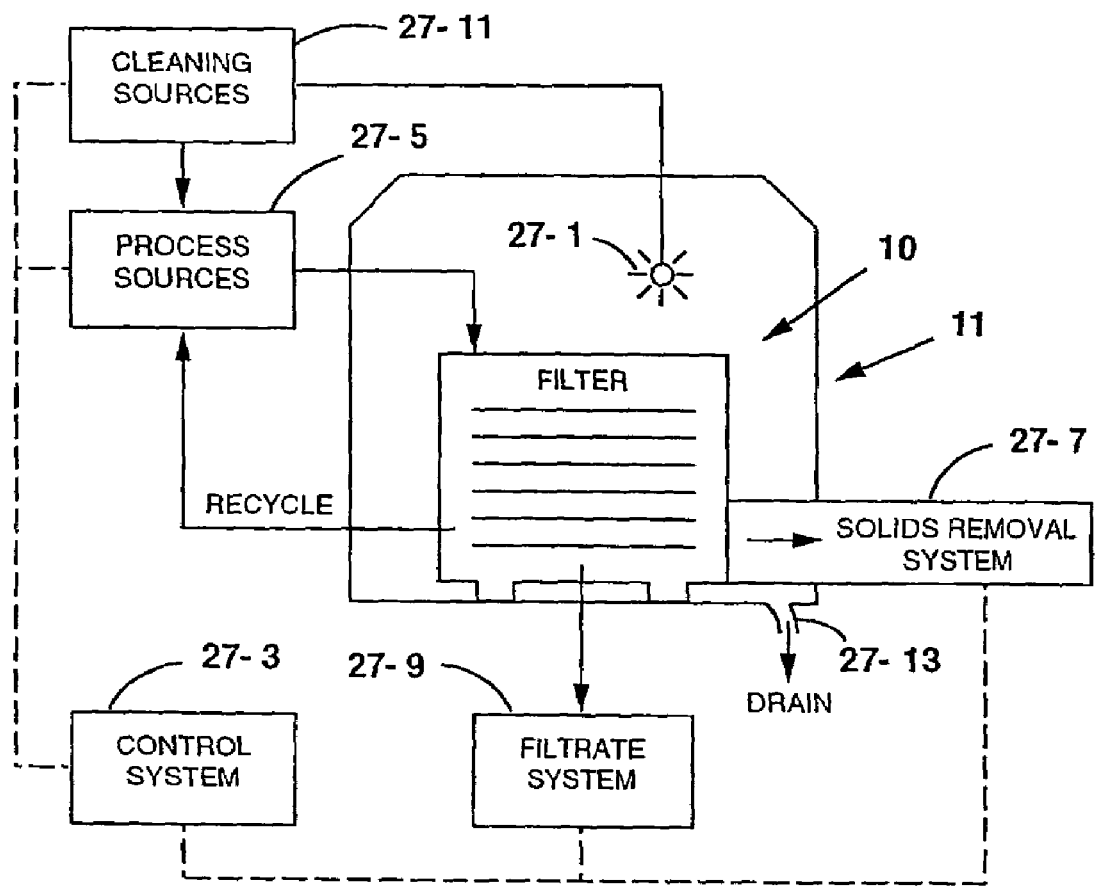
FIG. 27 is a schematic and block diagram illustration of the filter apparatus within a structure and controls of the operation and cleaning procedures of the filter apparatus.

FIG. 27 is a schematic illustration of the filter apparatus of the present invention in a housing structure. In some installations where food grade or pharmaceutical grade products are produced it becomes necessary to periodically thoroughly clean the interior and exterior surfaces of an apparatus. As illustrated in FIG. 27, the filter apparatus 10 is within a housing 11. The housing is constructed, in some cases, to totally contain the apparatus and any fluids or gasses that are derived from the apparatus. In the illustration the housing has interior spary nozzles 27-1 that directs cleaning fluids toward all exterior surfaces of the filter apparatus. Only one nozzle is shown; however, it should be understood that several nozzles are represented by the one shown and that those several nozzles direct cleaning fluids toward all surfaces (top and bottom) of the apparatus. The interior of the apparatus can be cleaned either by circulating cleaning fluids through the system or by spraying the apparatus while the chambers are opened. The illustration of FIG. 27 includes a control system 27-3 that provides control for the operation of the filter apparatus both in its filtering function and in the cleaning process. The control system is operationally connected to process sources 27-5, solids removal system 27-7, filtrate system 27-9 and cleaning sources 27-11. The control system 27-3 may include a programable computer that includes programs for the filtering function including the control of the travel of the filter belt and the cleaning function both interior and exterior.

In the normal filtering function, the control system 27-3 controls the closing and opening of the filter plates in the formation of a filter chamber and the introduction of slurry, wash fluids and gasses from the process sources 27-5 into the chambers. Any excess slurry, wash fluids or gasses when a chamber is filled or pressurized are recycled to the process source. The cycles of the filter apparatus produce solids that are transported to the solids recovery system 27-7 and filtrate that passes to the filtrate system 27-9.

When cleaning of the filter apparatus is required, the control system 27-3 initiates the entry of cleaning fluids from the cleaning sources 27-11 into the washing nozzles 27-1 within the housing including variable cycles, variable directions and variable pressures. When the interior of the filter apparatus is to be cleaned by the circulation of cleaning fluids, the control system 27-3 directs cleaning fluids to the process sources 27-5 to cycle those cleaning fluids through the interior of the apparatus. It is also possible to clean the interior of the filter apparatus with the plates open using the nozzles 27-1.

All fluids draining from the cleaned filter apparatus flow away from the apparatus and into a cleaning fluid drain 27-13 to exit from the housing 11. The cleaning fluids may be of any desired form including sterilizing and sanitizing liquids or gasses. Examples of such liquids are hypochlorite, peracetic acid, citric acid and other cleaning, sterilizing or sanitizing compounds.

The feature of being contained within a housing and in a position to be treated with cleaning fluids makes the present apparatus suitable for sanitary processing of products. The entire cleaning process can be automatically conducted under the control of the control system and can be completed in a minimum amount of time.

The features shown in the several FIGS. of this disclosure are intended to show construction of a filter apparatus that is capable of producing food grade or pharmaceutical grade products. In that environment, all possible surfaces that might contain or retain contaminating materials must be self draining away from the apparatus or be able to be cleaned in place in operation of the apparatus. In the apparatus here shown, horizontal surfaces that could retain contaminants are minimized. Surfaces joined together have rounded, ie chamfered or beveled connections or welds, any conduit that carries slurry or filtrate slopes away from the apparatus, and all cleaning operation performed on the filter belt drains to a drain pan that slopes away from the apparatus. If the assembled apparatus requires external cleaning, the apparatus can be contained within a structure that will include cleaning equipment, such as spray nozzles, that pressure clean the apparatus and the draining cleaning materials and any debris will drain away from the apparatus. To assist in directing draining cleaning materials all exterior surfaces and interior surfaces should be smoothly polished and sloping away from the interior of the Apparatus to Allow slurry material and contaminants to shed and drain away from the apparatus or have no horizontal surfaces that might retain contaminants.

While certain preferred embodiments of the invention have been specifically disclosed, it should be understood that the invention is not limited thereto as many variations will be readily apparent to those skilled in the art and the invention is to be given its broadest possible interpertation within the terms of the following claims.

We claim:

1. A pressure filter apparatus for separating a slurry into slurry liquid and slurry solids and for forming a substantially dry slurry solid cake from said slurry comprising:
   at least one chamber within said apparatus, said chamber having an interior portion and an exterior portion, said chamber comprising a lower plate portion having an upper cavity and an upper plate portion having a lower cavity, said upper cavity and lower cavity being closeable against each other to form said chamber and to produce said interior portion and said exterior portion,
   support means for said upper plate portion and lower plate portion forming said chamber,
   means for pressing said plate portions toward each other to form said chamber, means for separating said plate portions to open said chamber, said separating means being external to said plate portions,
   filter medium means aligned so as to be positionable within said chamber,
   filter medium means aligned so as to be positionable within said chamber,
   filter medium transporting means for moving said filter medium with respect to said chamber,
   input port means for introducing slurry into said chamber when said plates are pressed together,
   exit port means for withdrawing fluids from said chamber,
   said support means, means for pressing, means for separating, said input port means, said exit port means, said filter medium means, and said filter medium transporting means being formed with respect to said chamber so as to drain liquids and transported solids away from said apparatus,
   whereby said pressure filter apparatus may be cleaned in place with cleaning materials and all surfaces of said apparatus will drain cleaning materials away from said apparatus.

2. The pressure filter apparatus of claim 1 wherein a plurality of filter chambers are supported on said support means.

3. The apparatus of claim 2 wherein said means for separating said plates includes brackets connected to said plates of said apparatus, pins movably connected to said brackets, links cooperating with said pins, said rackets, pins and links being formed with rounded surfaces to prevent accumulation of retained materials and to assist in cleaning said apparatus.

4. The apparatus of claim 2 wherein said means for separating said plates includes guide means for aligning said plates, said means for transporting said filter medium includes filter medium guides for guiding said filter medium into said chamber, said plate guide means and said filter medium guide means being accessible to the exterior of said apparatus and each including vertical and rounded surfaces to prevent accumulation of retained materials.

5. The pressure filter apparatus of claim 1 wherein exterior surfaces of said plate are rounded so as to avoid flat surfaces where contaminants might be lodged.

6. The pressure filter apparatus of claim 1 wherein said filter medium transporting means includes filter medium cleaning means exterior of said chamber, said cleaning means including nozzles for directing cleaning fluids against said filter medium to remove slurry solids for said medium, drain means for said cleaning fluids and cleaned solids from said cleaning means, said drain means including sloping cleaning fluid capturing means for directing cleaning fluids and cleaned solids away from said apparatus.

7. The pressure filter apparatus of claim 6 wherein said apparatus is a plurality of filter chambers and each chamber includes filter medium cleaning means exterior of each chamber, each cleaning means includes drain means with sloping fluid capturing means for directing cleaning solids and cleaned solids into a common duct exterior of said apparatus.

8. The apparatus of claim 6 wherein said cleaning fluid is selected from the group including sterilizing and sanitizing materials.

9. The pressure filter apparatus of claim 1 wherein said input port means for slurry fluids into said chamber is connected to said lower cavity of said upper plate, said input port includes distribution means within said lower cavity for distributing said slurry fluids within said cavity when said cavity is formed as a part of said chamber.

10. The input port means of claim 9 wherein said input port means is connected by a sealed connection to an input header, the interior of said input port means having a sloping surface away form said chamber and into said input header.

11. The pressure filter apparatus of claim 1 wherein said exit port means is connected to said upper cavity of said lower plate, said exit port being connected to a fluid drain header for fluids from said cavity.

12. The exit port means of claim 11 wherein said exit port connection to said fluid drain header is a sealed connection, and the interior of said exit port having a sloping surface away from said chamber and into said fluid drain header.

13. The apparatus of claim 1 wherein said support means includes vertical elements, said vertical elements being truly vertical and having portions connected to substantially horizontal elements, said substantially horizontal elements having sloping surfaces to establish drainage away from said apparatus.

14. The apparatus of claim 13 wherein said connections between said vertical and said horizontal elements are rounded.

15. The apparatus of claim 13 wherein said connections between said vertical and said substantially horizontal elements are beveled of chamfered.

16. The apparatus of claim 13 wherein access is provided to said exterior and interior of said apparatus to permit washing of said vertical elements, substantially horizontal elements and interior and exterior portions, said elements and portions draining away from said apparatus.

17. The apparatus of claim 1 wherein said connections between said vertical and said substantially horizontal elements include tapered connections to drain said connections away from said apparatus.

18. The apparatus of claim 1 wherein said chamber has interior surfaces that are smoothly polished for freely releasing slurry solids within said chamber.

19. The apparatus of claim 1 wherein said lower cavity of said chamber includes means for supporting said filter medium within said chamber, said supporting means including:
   a perforated support grate having a surface aligned with the upper surface of said lower cavity,
   a plurality of rib members supported within said lower cavity, one surface of said ribs in contact with the bottom interior of said lower cavity and the other surface of said ribs in contact with and supporting said perforated grate, said ribs having cutout portions along said one surface,
   said perforated support plate grate and said ribs having rounded smooth surfaces to prevent accumulation of retained materials,
   said contact of said ribs with said lower cavity and said contact with said perforated grate being rounded smooth to prevent accumulation of retained materials within said cavity.

20. The apparatus of claim 1 wherein said exterior portion of said chamber, said support means, said means for pressing said plates toward each other, said means for separating said plates, said filter medium transporting means, said input port means, and said exit port means are fabricated with smooth polished surfaces that freely release any accumulation of retained materials and drain said materials away from said apparatus.

21. The apparatus of claim 20 wherein said interior of said chamber, said support means, said means for pressing, said means for separating, said input port and exit port being accessible from the exterior of said apparatus for cleaning all surfaces to prevent accumulation of retained materials.

22. The apparatus of claim 1 wherein said filter medium transporting means includes smooth polished exposed and sloping surfaces to prevent accumulation of retained materials and to drain said materials away from said apparatus.

23. The apparatus of claim 1 with the addition of filter medium cleaning areas exterior of said upper and lower plates, said cleaning areas including filter medium washing means for removing accumulation of retained materials from said filter medium.

24. The apparatus of claim 23 wherein said filter medium cleaning areas include washing means for directing wash fluids toward surfaces of said filter medium,
   said filter medium washing means including controls means for wash fluid pressure and direction toward said filter medium.

25. The apparatus of claim 24 wherein said control of said filter medium washing means includes multiple locations of staggered washing means and variable wash fluid pressures within said washing means.

26. The apparatus of claim 24 wherein said control means for said filter medium washing means includes controlling washing of said filter medium in variable cycles, variable directions and variable pressures.

27. The apparatus of claim 23 wherein said filter medium washing means includes means for collecting wash fluids and accumulated materials washed from said filter medium for directing said collected fluids and said materials away from said apparatus.

28. The apparatus of claim 23 wherein said filter medium washing area includes at least one wash fluid drain pan and a dram conduit for removing wash fluids and materials, said drain pan having an interior sloping surface for directing wash fluids and materials away from said filter medium, said drain pan draining to said drain conduit, said drain pan having smooth interior surfaces and rounded corners to prevent retention of materials within said drain pan.

29. The apparatus of claim 1 wherein said separating means external to said plates includes an arm having vertical and sloping surfaces to prevent accumulation of retained materials on said separating means.

30. The apparatus of claim 1 including brackets in said separating means, said brackets having vertical and sloping surfaces to prevent accumulation of retained materials.

31. The apparatus of claim 1 wherein said separating means includes links, said links having rounded, vertical, tapered surfaces to prevent accumulation of retained materials.

32. The apparatus of claim 1 wherein said means for transporting said filter medium includes a drive pulley, said drive pulley having a surface including means for preventing slipping of said filter medium around said drive pulley.

33. The apparatus of claim 32 including an idler pulley spaced from and aligned with said drive pulley, said idler pulley having an axis of rotation displaceable vertically and horizontally from an axis of rotation of said drive pulley so as to increase the circumferential contact of a filter medium contacting said drive pulley.

34. The apparatus of claim 33 with the addition of adjustable means for moving the axis of rotation of said drive pulley horizontally with respect to said apparatus to adjust the tension of said filter medium being transported with respect to said apparatus.

35. The apparatus of claim 1 wherein a portion of said filter medium passes through trainer means for accomplishing self alignment of said filter medium within said chamber and with respect to said apparatus.

36. The apparatus of claim 1 wherein said input port means includes an input header for slurry, wash fluids and gasses, flexible means connecting said input port means to said input header; said input port means, flexible means connecting, and input header draining away from said apparatus.

37. The apparatus of claim 1 wherein said output port means includes and output header for filtrate, wash fluids and gasses, flexible connection means connecting said output port to said output header; said output port means, flexible connecting means, and output header draining away from said apparatus.

38. The apparatus of claim 1 wherein said apparatus includes a programmable computer for controlling operation of said apparatus including programs for cleaning the interior and exterior of said apparatus, said cleaning being accomplished by cleaning sources exterior to said apparatus, said cleaning being programmed with selected cleaning fluids and gasses.

39. The apparatus of claim 38 wherein said programmable computer controls cleaning of the interior of said chamber when said filter plates are closed or separated.

40. The apparatus of claim 1 wherein all connections to said input port means and said exit port means are connections with sanitary fittings and valves with leak proof connections, and all surfaces of said fittings and valves have smooth surfaces that drain away from said apparatus.

41. The apparatus of claim 1 wherein all materials of construction for said apparatus are from the group including non-corrosive clad materials, stainless steel, and corrosion resistant materials, said materials adapted to drain and shed accumulated retained materials away from said apparatus.

42. The apparatus of claim 1 wherein all exterior surfaces are clad with non-corrosive materials and said cladding slopes away from said apparatus.

43. The apparatus of claim 42 wherein said clad surfaces are accessible for cleaning of said apparatus from the exterior of said apparatus.

44. The apparatus of claim 1 wherein said filter medium and said filter medium transporting means include means for increasing traction between said filter medium and said transporting means, said means including:
   means incorporated into said filter medium producing substantially non-slip contact between said filter medium and said transporting means, and
   means incorporated into the surface of said transporting means for producing a substantially non-slip contact between said transporting means and said filter means.

45. The apparatus of claim 1 wherein said filter medium transporting means includes a paddle structure supported on said chamber, said paddle structure including means for supporting the rotational axis of a drive pulley for said filter medium, and adjustment means cooperating with said chamber for supporting and providing for movement of said means for supporting said rotational axis toward and away from said chamber to position said filter medium with respect to a chamber.

46. The apparatus of claim 45 wherein said paddle structure and said adjustment means are located at each side of said support structure to provide independent adjustment of said drive pulley at each side of said apparatus.

47. The apparatus of claim 1 enclosed within a structure to provide a contained space for cleaning the interior an exterior of all surfaces of said apparatus, said structure adapted to contain cleaning fluids and to collect cleaning fluids draining from cleaned sloping and polished surfaces of said structure.

48. The apparatus of claim 47 wherein said cleaning fluids include sterilizing and sanitizing materials.

49. The apparatus of claim 1 with the addition of a programmable computer controller for controlling the sequential operations of said filter apparatus and said cleaning processes.

\* \* \* \* \*